Patented May 27, 1952

2,598,453

UNITED STATES PATENT OFFICE 2,598,453

DIAZOTYPE COMPOSITION FOR SILICEOUS SURFACES

Sam Charles Slifkin, Binghamton, N. Y., assignor to General Aniline & Film Corporation, New York, N. Y., a corporation of Delaware No Drawing. Application December 27, 1946, Serial No. 718,881

9 Claims. (Cl. 95—7)

This invention relates to light-sensitive diazotype layers. More particularly, it relates to such layers on a liquid impervious siliceous surface and to a process of producing diazotype reproductions thereon.

Diazotype reproduction media are generally produced by treating an adherent or absorbent surface with a solution containing the azo dye components which are employed to reproduce the image in an uncombined form. This treating or coating solution in the case of the most commonly used base material, which is paper, may be an aqueous solution and sufficient penetration of the paper structure or fibers is accomplished with such an aqueous solution to insure a bond between the paper surface and the ultimate developed dye image. Other commonly used base materials such as films of regenerated cellulose, cellulose esters and cellulose ethers require the addition of swelling or penetrating agents which have a solvent action on the cellulosic material in order to produce the impregnation necessary to insure a permanent bond between the carrier or base and the reproduced dye image. Such solutions as these which have been found to be suitable for coating paper or cellulosic films do not produce satisfactory coatings on a liquid impervious surface of siliceous materials such as glass, tile and other ceramic surfaces and enameled surfaces on metal or wood. Coatings of diazotype materials can be made on such liquid impervious siliceous surfaces while using the ordinary coating solutions which have been successful on paper and film but due to the lack of bond between the diazotype layer and the base material, the diazotype layer is apt to be non-uniform and easily rubbed off in use. Furthermore, the dye images reproduced on the surface by exposure and development will have little permanency and in order to prevent the images from being easily rubbed off, it will be necessary to overcoat the reproduced image with a transparent resinous coating or cover.

It is the object of this invention to provide a method of producing a light-sensitive diazotype layer on a liquid impervious siliceous surface which will have a sufficient bond with the material of the siliceous surface to provide a uniform adhering layer of the diazotype components, said layer being capable of producing a dye image which has a permanent bond with the siliceous surface and will not be easily rubbed off.

For the attainment of this object a film-producing solution or plastic "dope" is prepared from a suitable film-forming plastic such as cellulose acetate, plasticizers and the usual solvents employed in the preparation of film-forming solutions from such plastics. To this film-forming solution or plastic "dope" is added the active agents including the light-sensitive diazo compound, the azo dye coupling components, stabilizing materials and anti-oxidants. This film-forming solution or plastic "dope" containing the diazotype components will form a diazotype film coating on any suitable surface upon which it is cast as a film but in order to produce a permanent bond between the film and the liquid impervious siliceous surfaces contemplated by this invention, there is added to the film-forming solution or plastic "dope" a solvent containing silicon such as ethyl silicate or other silicic acid esters or a resin derived from silane (silicones), which resin is soluble in the "dope" solvents, or both; that is, silicon solvents or resins derived from silane are mixed into the plastic "dope" during its preparation along with the active ingredients of the diazotype composition and mixing of the "dope" is continued until a smooth, almost homogeneous solution, has been obtained. The siliceous surface is coated with the thus prepared plastic "dope" by dipping or whirling the siliceous surface, such as tiles, in the plastic "dope" or by spraying the latter on the siliceous surface. If the surface to be treated is extensive and cannot be easily handled by a dipping or whirling procedure or conveniently sprayed with the plastic "dope," then the film-forming solution or plastic "dope" may be applied by means of a hopper in accordance with the procedure generally employed in film casting. In using this method care must be taken to regulate the thickness of the layer so that the resulting film will be of uniform thickness. After coating the siliceous surface with the plastic "dope" containing the diazotype active agents and the bonding agent or silicon solvent, the plastic solvents are evaporated from the treated surface by gently heating at somewhat elevated temperatures thus leaving an adherent layer of film on the siliceous surface containing the diazotype components. The treated surface is then exposed under the pattern which it is desired to reproduce on the surface and developed by treatment with an alkaline agent such as ammonia gas. The exposed and developed surface is then baked at a moderate temperature to harden the coating.

As is known in the diazotype art, there are many diazo compounds and azo coupling components which combine to form azo dye images suitable for the production of diazotype layers. In order to reproduce the image as a positive, the diazo compound must be light-sensitive so that it will decompose to a compound no longer capable of forming an azo dye with an azo component in those areas which are exposed to light. It must also be capable of coupling under alkaline conditions such as exposing the diazotype layer to an atmosphere of ammonia gas and at the same time it must be capable of existing in the diazotype layer in a stable form so that it will not prematurely couple with the coupling component and thus produce an undesirable background color. This property of the diazo compound which may be enhanced by the addition of stabilizing agents and small amounts of acids to the coating solution used in producing the diazotype layer endows the diazotype layer with shelf-life thereby eliminating the necessity of preparing the diazotype material immediately before use. Any of the diazo compounds known to the art which have these requisite properties may be employed in the composition of this invention as the light-sensitive and color forming agent. Although it is preferred to have the azo coupling component incorporated into the composition together with the diazo compound to form a two-component diazotype system suitable for dry development, nevertheless, the coating composition of this invention may contain the diazo compound as the only dye component. In that case, development is effected by the usual one-component diazotype procedure of treating the exposed diazotype layer with an alkaline solution containing the coupling component.

As in the case of diazotype coatings on paper or resinous film bases such as are obtained from cellulose esters or ethers or regenerated cellulose, the image of a design or photographic picture may be reproduced in any desired color by proper selection of the diazo copound and the azo coupling component constituting the color forming components. Thus, the color of a reproduction is independent of the color of the original which is generally black on white or black on a colorless background or may even be a cut-out design or pattern. Various effects may also be produced by proper selection of the dye components. Thus, where the original is a photographic positive containing half-tone and full density areas, such different areas may be reproduced in contrasting colors by incorporating two or more coupling components of widely divergent coupling potentials with a single diazo compound.

Diazo compounds which are known to be suitable for two-component diazotype layers and are therefore preferred for the preparation of the coating compositions of this invention are those which are derived from 1,2 and 2,1-aminonaphthols, 1,4-aminonaphthols and aromatic p-diamines of the benzene series, particularly those which are N-mono or di-substituted on the undiazotized amino groups. Examples of such compounds which are commonly used in the production of diazotype images of high contrast are diazo derivatives of p-amino-N-methyl aniline, p-amino-N-dimethyl aniline, p-amino-N-ethyl aniline, p-amino-N-diethyl aniline, p-amino-N-ethoxy aniline, p-amino-N-ethyl-N-ethoxy aniline, 4-amino-2-methoxy-1-cyclohexyl aniline, 1-amino-4-(dibrom-2',6'-benzyl) aminobenzene, p-amino-N-diethyl-m-toluidine, 1-amino-3-methyl-4-ethylaminobenzene, 3-aminocarbazole, 1-amino-2-naphthol-4-sulfonic acid, and 2-amino-1-hydroxy-3,6-naphthalene disulfonic acid.

As coupling components, any compound which will function as a coupling component may be employed either in the coating composition together with the diazo compound in order to produce a two-component system or in the developing solution as a color forming developer. In either case the coupling component selected will be one which will produce the desired color or a combination of coupling components which will produce a desired multi-color effect. Examples of preferred coupling components are: sodium salt of 2-amino-8-naphthol-3,6-disulfonic acid, 2,3-dihydroxy naphthalene or its 6-sulfonic acid derivative, β-naphthol-3,6-disulfonic acid, 2,7-dihydroxy naphthalene, 1,7-aminonaphthol, 2-hydroxy naphthalene-8-biguanide, 1-amino-8-naphthol-3,6-disulfonic acid, 1-naphthol-4-sulfonic acid, 1-naphthol-3,8-disulfonic acid, phloroglucinol, m-hydroxyphenylurea, acetoacetanilide, 7-hydroxy-1,2-naphthimidazole, 7-hydroxy naphthalene-1-biguanide and acetoacetcyclohexylamide.

The tile, glass or other siliceous materials containing the colored designs or pictures produced thereon in accordance with this invention may be used anywhere that pictured tiles, pictured glassware or other pictured siliceous surfaces are ordinarily employed. The colored designs will not run upon application of water and will not be affected by atmospheric conditions. The resin coating containing the design will permanently adhere to the siliceous surface upon which it has been hardened by the baking treatment. The permanence of the bond between the resin coating and the siliceous surface it is believed is due to the ability of the siliceous compounds used in the coating composition of this invention to form a bond with the surface of the siliceous base and thus hold the film onto the base by forming an inter-meshing network or matrix joining the film to the silicon bonded base.

The following example will serve to further illustrate the manner of performing this invention, it being understood that the materials and proportions therein employed are illustrative and that the invention is not limited to any of the specific materials or proportions employed in this example. Unless otherwise specified, the proportions are by weight.

Example

A plastic "dope" or coating composition is made up of the following composition:

| | |
|---|---|
| Cellulose acetate | g-- 4 |
| Triphenyl phosphate | g-- 1 |
| Acetone | cc-- 25 |
| Methanol | cc-- 25 |
| Dioxane | cc-- 25 |
| Methyl ethyl ketone | cc-- 25 |
| Ethyl silicate | cc-- 25 |
| Thiourea | g-- 1 |
| Citric acid | g-- 1 |
| 2,3-dihydroxynaphthalene | g-- 0.5 |
| p-Diazo N-diethylaniline | g-- 0.2 |

This coating composition is prepared by mixing the cellulose acetate with the triphenyl phosphate, acetone, methanol, dioxane and methyl ethyl ketone in accordance with the known methods for the solution of cellulose esters and ethers until a smooth homogeneous solution has been obtained. During the course of the preparation of this homogeneous solution or "dope," the ethyl silicate, thiourea, citric acid and the dye components are slowly added so as to insure thorough and even mixing. The thus prepared composition is then poured on a tile surface, allowed to set and dry. Drying may be accelerated by gently applying heat at somewhat elevated temperatures. After the surface has been thoroughly dried, it is exposed to light under a photographic transparent positive picture. The image is then developed by passing the exposed treated tile through an atmosphere of ammonia fumes. The exposed and developed tile surface is then baked for two hours at 80° C. A blue positive image of the original in a permanently adherent transparent surface on the tile base is thereby produced.

Any resinous or plastic material which is capable of being dissolved in a volatile solvent to form a free flowing plastic mass in which state it can be recast by pouring or spraying may be used in place of the cellulose acetate of this example. Such resins as cellulose butyrate, cellulose propionate or mixtures of these esters, water insoluble cellulose ethers such as cellulose ethyl ether and super-polyamides are suitable substitutes. Also, the ethyl silicate may be replaced by other silicic esters or silicones such as chloro silane and amino silane. As indicated above, the dye components may be substituted by any desired diazo compound and coupling component, depending upon the color effect which is to be obtained. The solvents used for producing the plastic "dope" will, of course, depend upon the particular plastic or resin selected while the stabilizing agents, thiourea and citric acid, may be substituted by any of the stabilizing agents commonly used in diazotype solutions as long as they are compatible with the plastic and plastic solvents.

I claim:

1. A light-sensitive diazotype reproduction medium on a liquid impervious siliceous surface, comprising a mixture of a light-sensitive diazo compound suitable for two-component diazotype layers, an azo coupling component, a film forming plastic selected from the group consisting of cellulose esters, cellulose ethers and super-polyamides; and a silicon compound selected from the group consisting of silicic acid esters and silicones.

2. A light-sensitive diazotype reproduction medium on a liquid impervious siliceous surface, comprising a mixture of a light-sensitive diazo compound derived from a p-diamine of the benzene series, an azo coupling component, a film forming plastic selected from the group consisting of cellulose esters, cellulose ethers and super-polyamides; and a silicon compound selected from the group consisting of silicic acid esters and silicones.

3. A light-sensitive diazotype reproduction medium on a liquid impervious siliceous surface, comprising a mixture of a light-sensitive diazo compound derived from a p-diamine of the benzene series, an azo coupling component, a film forming plastic selected from the group consisting of cellulose esters, cellulose ethers and super-polyamides; and ethyl silicate.

4. A light-sensitive diazotype reproduction medium on a liquid impervious siliceous surface, comprising a mixture of a light-sensitive diazo compound derived from a p-diamine of the benzene series, an azo coupling component, cellulose acetate and ethyl silicate.

5. A light-sensitive diazotype reproduction medium on a liquid impervious siliceous surface, comprising a mixture of a light-sensitive diazo compound suitable for two-component diazotype layers, an azo coupling component, a film forming plastic selected from the group consisting of cellulose esters, cellulose ethers and super-polyamides; and chlorosilane.

6. A light-sensitive diazotype reproduction medium on a liquid impervious siliceous surface, comprising a mixture of a light-sensitive diazo compound derived from a p-diamine of the benzene series, an azo coupling component, cellulose acetate and chlorosilane.

7. A light-sensitive diazotype reproduction medium on a liquid impervious siliceous surface, comprising a mixture of a light-sensitive diazo compound suitable for two-component diazotype layers, an azo coupling component, a plastic selected from the group consisting of cellulose esters, cellulose ethers and super-polyamides; and aminosilane.

8. A light-sensitive diazotype reproduction medium on a liquid impervious siliceous surface, comprising a mixture of a light-sensitive diazo compound derived from a p-diamine of the benzene series, an azo coupling component, cellulose acetate and amino silane.

9. A light-sensitive diazotype reproduction medium on a liquid impervious siliceous surface, comprising a mixture of p-diazo N-diethylaniline, 2,3-dihydroxynaphthalene, cellulose acetate and ethyl silicate.

SAM CHARLES SLIFKIN.

REFERENCES CITED

The following references are of record in the file of this patent:

UNITED STATES PATENTS

| Number | Name | Date |
| --- | --- | --- |
| 1,756,400 | Schmidt et al. | Apr. 29, 1930 |
| 2,258,218 | Rochow | Oct. 7, 1941 |
| 2,397,866 | McQueen | Apr. 2, 1946 |
| 2,405,523 | Sease et al. | Aug. 6, 1946 |
| 2,433,515 | Jahoda | Dec. 30, 1947 |